Dec. 27, 1966     H. M. VALENTINE     3,294,455
VEHICLE FLUID PRESSURE BRAKE SYSTEM AND CONTROL VALVE
Filed April 3, 1964     2 Sheets-Sheet 1

INVENTOR
HARRY M. VALENTINE

BY Scrivener, Parker, Scrivener & Clarke
ATTORNEY

Dec. 27, 1966  H. M. VALENTINE  3,294,455
VEHICLE FLUID PRESSURE BRAKE SYSTEM AND CONTROL VALVE
Filed April 3, 1964  2 Sheets-Sheet 2
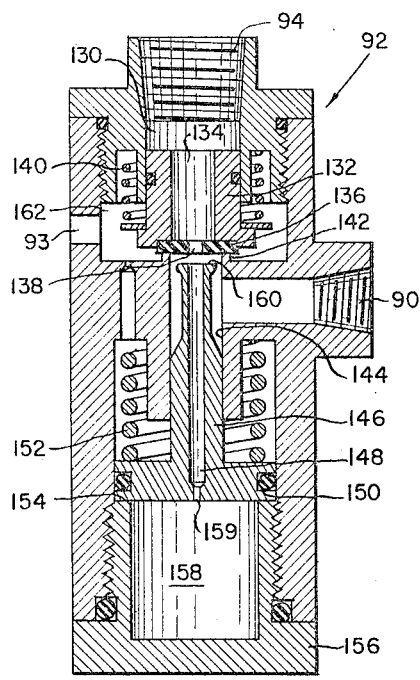
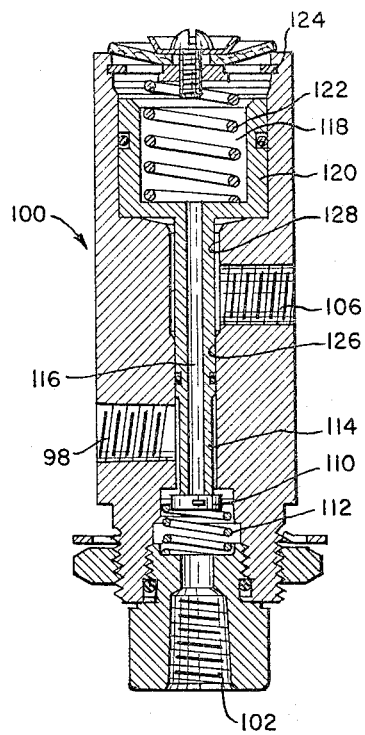
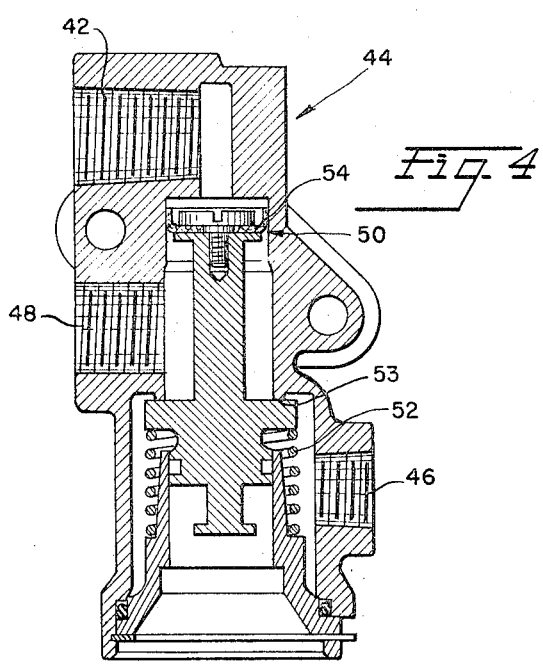
INVENTOR
HARRY M. VALENTINE
BY *Scrivener, Parker, Scrivener & Clarke*
ATTORNEYS

United States Patent Office 3,294,455
Patented Dec. 27, 1966

3,294,455
VEHICLE FLUID PRESSURE BRAKE SYSTEM AND CONTROL VALVE
Harry M. Valentine, Elyria, Ohio, assignor to Bendix-Westinghouse Automotive Air Brake Company, Elyria, Ohio, a corporation of Delaware
Filed Apr. 3, 1964, Ser. No. 357,199
16 Claims. (Cl. 303—9)

This invention relates to fluid pressure braking systems employing fluid pressure released, spring applied brake locking means for locking brake actuators in applied position and also to valve means which are particularly but not exclusively adapted for use in such systems.

Fluid pressure actuators employing fluid pressure released, spring applied brake locking means of the type to which the present invention relates are described in the co-pending application of Frank R. Schubert, Serial No. 263,330 filed March 6, 1963, now Patent No. 3,228,729 dated January 11, 1966, and assigned to the same assignee as the present invention. Briefly, the actuator there shown and described comprises an actuator housing containing emergency and service diaphragms and a brake lock which is normally urged by spring force to locking position but is retained in unlocking position by fluid pressure. When the lock is released a normal service application of the brakes is achieved by admitting fluid pressure from a brake valve to the service diaphragm. During an emergency or when the brakes are to be parked, fluid pressure is exhausted from the brake locking means and pressure is admitted to the emergency diaphgram to move the actuator to brake applied position where it is retained by the brake locking means. It is undesirable that fluid pressure be admitted to the service diaphragm with the locks engaged lest excessive load be placed on the brake actuating lever or slack adjuster and one of the principal objects of the present invention is to provide in a system employing an actuator of the mentioned type, means to prevent the admission of fluid to the service diaphragm when the locks are engaged. Stated differently, an object of the invention is to prevent the application of the parking brake locking means when service pressure is admitted to the service diaphragm.

Another object of the invention is to provide in a system of the foregoing nature, means for automatically limiting the pressure delivered to the emergency diaphragm during parking or under emergency conditions whereby the brakes cannot be applied with such force that it would be difficult to subsequently release the brake locking means.

Yet another object of the invention is to provide an improved pressure limiting or cut out valve which incorporates time delay features wherein after the locks are applied during parking or an emergency, emergency pressure only sufficient to apply the brakes is admitted to the emergency diaphragm, the emergency fluid in the actuator being thereafter released automatically to atmosphere.

Other objects and their attendant advantages will become apparent as the following detailed description is read in conjunction with the accompanying drawings.

FIG. 2 is an enlarged cross-sectional view of a pressure limiting valve of the present invention;

FIG. 3 is an enlarged cross-sectional view of a second control valve employed in the system of the invention; and FIG. 4 is an enlarged cross-sectional view of a cutoff valve employed in the system of the invention.

Figure 1:
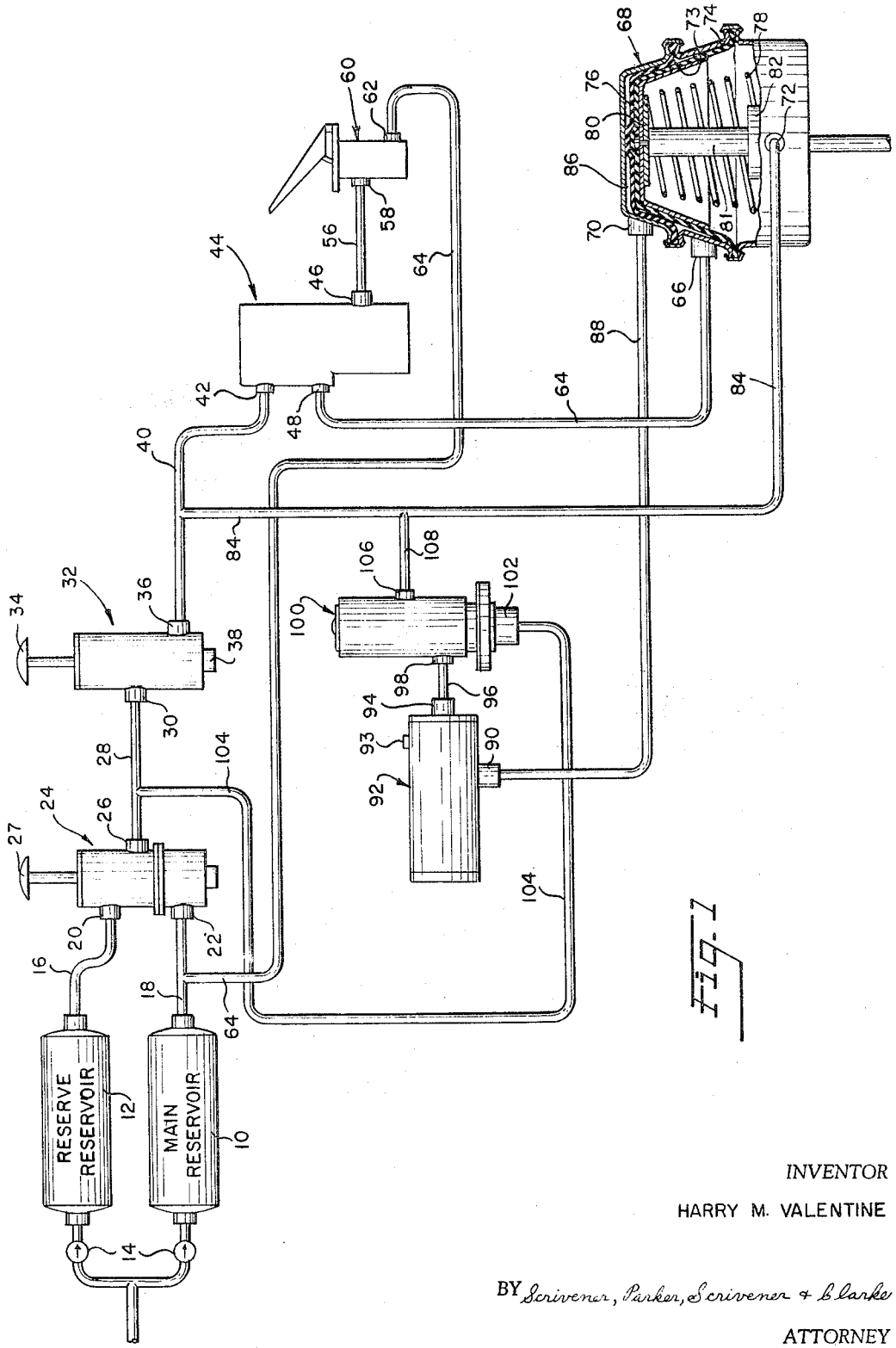
FIG. 1 is a schematic representation of a fluid pressure brake system incorporating the features of the present invention.

Referring now to the drawings, the numerals 10 and 12 designate respective main and reserve fluid pressure reservoirs which are supplied with fluid through a pair of check valves 14 from a common source such as a compressor (not shown). The reservoirs 10, 12 have outlets connected to respective conduits 16, 18 leading to inlet ports 20, 22 of a two-way control valve 24, preferably of the type disclosed in Patent No. 3,087,760, having a common outlet 26. The valve 24 is provided with a handle 27 which in one position operates a valve member (not shown) to connect one inlet port, say inlet port 22 with the outlet port 26 and in the other position connects the inlet port 20 with the outlet port 26 while disconnecting the first inlet port from the outlet port. Connected to the outlet port 26 is a conduit 28 leading to the inlet port 30 of a second control valve 32 having a handle 34 and preferably of the type disclosed in Patent No. 3,095,244.

When the handle 34 of valve 32 is pushed downwardly it operates a valve member (not shown) to connect the inlet port 30 with the outlet port 36 while disconnecting the latter from an exhaust port 38. Furthermore when the handle is in the latter position, it is retained by fluid pressure above a predetermined level at the inlet port in the down position against the force of a spring. When the pressure at the inlet port falls below the predetermined level, the spring snaps the handle automatically to its upper position whereupon the inlet port 30 is disconnected from the outlet port 36 and the latter is connected to the exhaust port 38.

A conduit 40 is connected to the outlet port 36 and leads to a control port 42 at the upper end of a shutoff valve 44, preferably of a type similar to that shown in Patent No. 3,104,133, having inlet and outlet ports 46, 48. As illustrated in FIG. 4, the valve 44 is of relatively simple construction and includes a piston member 50 exposed at all times to fluid pressure at the control port 42. When pressure above a predetermined level exists at the control port the piston 50 is moved downwardly against the upward force of a spring 52 to open a normally closed check valve 53 and thereby connect the inlet port 46 with the outlet port 48. The piston 50 includes a cup washer 54 so that pressure below the piston in excess of the pressure above it can flow upwardly past the rim of the cup washer to the control port 42 but fluid flow in the reverse direction is prevented by the cup washer in a manner well recognized by those skilled in the art.

The inlet port 46 of the valve 44 is connected by way of a conduit 56 with the outlet port 58 of a conventional brake valve 60 whose inlet port 62 is connected by way of a branch conduit 64 with the main reservior 10. The outlet port 48 of the valve 44 is connected by way of a conduit 64 with the service port 66 of a double diaphragm brake actuator 68.

The actuator 68 is described in detail in the previously mentioned pending application Serial No. 263,330, now Patent No. 3,228,729, and includes in addition to the service port 66, an emergency port 70 and a lock port 72. The service port 66 leads to space 73 between a service diaphragm 74 and an emergency diaphragm 76 both of which, in the no-air condition of FIG. 1, are retained in the brake-release position shown by a spring 78 which operates on a push plate 80 integral with a push rod 81 which, when moved downwardly in FIG. 1, serves to apply the brakes.

The lock port 72 leads to spring applied, pressure released brake locking means generally indicated by the numeral 82 and more particularly described in the aforementioned pending application, it being sufficient to say here that when pressure above a predetermined level, say 60 p.s.i., is admitted to the lock port 72 the locking mechanism is retained in an unlocking position but when pressure at the lock port is below the predetermined level, the locks are moved automatically by spring force to their locking position whereupon, if the brakes are already applied, they are retained by the locking mechanism in their applied position, but if the brakes are not yet applied they permit one-way travel of the push rod in a brake applying direction while preventing travel in the reverse direction.

As previously explained it is desirable to prevent the admission of pressure from the brake valve 60 to the service diaphragm 74 when the locks are in their locking position, that is to say, when pressure has been released from the lock port 72 so that the locks are in applied condition. In accordance with the invention this is accomplished by connecting the lock port 72 by means of a conduit 84 with the control conduit 40 interconnecting the outlet port 36 or the manual control valve 32 with the control port 42 of the shutoff valve 44. It will thus be seen that when the handle 34 of the valve 32 is moved either manually or automatically to a position connecting the outlet port 36 with the exhust port 38 fluid pressure will be simultaneously exhausted from the control port 42 of the shutoff valve 44 and from the lock port 72 by way of conduit 84. As soon as control pressure is released from the valve 44 the check valve 53 moves to the closed position of FIG. 4 to positively disconnect the brake valve from the outlet port 48 of valve 44 and hence the service port 66 of the actuator. Fluid pressure which might exist at the service port 66 escapes to atmosphere around the cup washer 54 as previously described so that all pressure is relieved from the service cavity 73 in the actuator. When the handle 34 of valve 32 is moved to its second or down position fluid pressure flows through the valve to the outlet port 36 as previously described and then flows simultaneously to the control port 42 of the shutoff valve 44 and to the lock port 72 to urge the lock to its unlocking position and this condition prevails so long as the shutoff valve 44 is conditioned by pressure from valve 32 to permit service pressure to flow from the brake valve 60 to the service port 66 of the actuator.

Whenever the valve 32 is moved to its exhaust position, either manually, as when parking, or automatically due to emergency loss of pressure, it is intended that the brake be applied and locked in applied position until pressure has been restored in the system. In accordance with the invention, the actuator is moved to applied position under parking or emergency conditions by the admission of pressure to the emergency port 70 where it flows to an emergency cavity 86 in the actuator to operate on the emergency diaphragm 76 and apply the brakes. Pressure is delivered to the emergency port 70 by way of a conduit 88 whose opposite end is connected to the outlet port 90 of a novel pressure limiting valve 92, hereinafter described in detail, having an exhaust port 93 and an inlet port 94 connected by way of a conduit 96 with an outlet port 98 of a control valve 100 which is the same as valve 106 shown in FIG. 1 in application No. 263,330 filed March 6, 1963, now Patent No. 3,228,729 and assigned to the same assignee as the present invention. The latter valve has an inlet port 102 connected by way of a conduit 104 with the conduit 28 leading to the outlet port 26 of the two-way valve 24 and is also provided with a control port 106 which is connected by way of a branch conduit 108 with the aforementioned conduit 84 leading to the outlet port 36 of the control valve 32 as previously described.

With reference now to FIG. 3, the inlet port 102 of the valve 100 leads to a check valve cavity containing a check valve 110 which is urged at all times by a spring 112 towards its closed position. The valve 110, however, is normally retained off its seat as shown in FIG. 3 through the action of a plunger 114 having an exhaust passage 116 therein which is closed when the lower end of the plunger 114 is in engagement with the upper surface of the check valve 110. The upper end of the exhaust passage 116 leads to an open exhaust cavity 118 formed in an enlarged piston part 120 which is integral with the upper end of the plunger 114. Received in the exhaust cavity is a spring 122 whose upper end engages a snap ring 124 so that the spring 122 is compressed to urge the piston and plunger assembly to the position of FIG. 3. The plunger 114 is slideably within a bore 126 whose upper end 128 is enlarged and serves to connect the control port 106 with the underside of the piston part 120. When control pressure of sufficient magnitude is admitted to the control port 106 the piston part 120 is moved upwardly until the check valve 110 is closed thereby interrupting communication between the inlet and outlet ports 102, 98 while the latter is connected to atmosphere through the now open exhaust passage 116 in the plunger 114. When control pressure is relieved from the port 106 the parts of the valve move to the position of FIG. 3 to establish communication between the inlet and outlet ports.

As so far described it will be apparent that when fluid pressure is relieved from the lock port 72 of the actuator and the control port 42 of the shutoff valve 44 it is simultaneously relieved from the control port 106 of the control valve 100 thus communicating pressurized fluid in conduit 104 with the outlet port 98 of control valve 100 whence it flows by way of conduit 96 to the inlet port 94 of the valve 92.

With reference now to FIG. 2, the inlet port 94 of valve 92 leads to a cylindrical cavity 130 in which there is slideably received a piston-like member 132 having an enlarged bore 134 therethrough. At the lower end of the member 132 is a resilient, washer-like valve member 136 having a central opening 138 therein. The piston member 132 is urged by a spring 140 to the position of FIG. 2 wherein the lower surface of the valve member 136 is normally in sealing engagement with an exhaust valve seat 142 surrounding the upper end of a central bore 144 which is connected, as shown, to the aforementioned outlet port 90 and also slideably receives a plunger 146 integral with a piston member 150 and having a central bore 148 therethrough. The piston member 150 is urged by a spring 152 against a shoulder 154 of a hollow cap member 156 containing a cavity 158 which communicates with the passage 148 in the plunger 146 through a restricted orifice or choke 159 in the piston 150.

When fluid pressure is admitted to the inlet port 94 of valve 92 it flows through the opening 138 to the outlet port 90. At the same time fluid flows into the passage 148 in the plunger 146 and bleeds into the cavity 158 through the choke 159 at a restricted rate. Because the effective area of the piston member 150 exposed to the pressure in the cavity is substantially greater than the effective cross-sectional area of opposing parts, after sufficient pressure has built up in the cavity 158 through the choke 159 the piston member and hence the plunger commence moving upwardly until the upper annular edge 160 of the plunger sealingly engages the lower surface of the valve member 136 to close off the opening 138 and prevent the further flow of fluid from the inlet to the outlet port. As the piston member 150 continues to rise it moves the cylinder-member 132 upwardly in FIG. 2 until the valve member 136 is unseated from the exhaust valve seat 142 whereupon the outlet port is connected to an exhaust cavity 162 communicating with atmosphere through the aforementioned exhaust port 93.

By coordination of choke size, effective areas and spring forces it will be apparent that valve 92 will deliver to the outlet port only a predetermined pressure at which point further fluid flow is cut off and fluid previously delivered to the outlet port is thereafter exhausted to atmosphere, with the outlet port 90 being retained connected with atmosphere so long as pressure above a predetermined level is delivered to the inlet port 92 so as to operate on the lower surface of the piston member 150.

In operation and assuming normal running conditions, the handle 27 of the two-way control valve 24 is pulled to its upper position to connect the main reservoir 10 with the inlet port 30 of the control valve 32 and at the same time fluid flows by way of the conduit 104 to the emergency port 70, via the valves 100 and 92 and the interconnecting conduits 96 and 88, where it acts on the emergency diaphragm which tends to apply the brakes. With the main reservoir being above a predetermined level, when the handle 34 of the control valve 32 is pushed downwardly it is retained by fluid pressure in this position to connect the inlet port 30 with the outlet port 36 while disconnecting the latter from the exhaust port 38. Thus fluid flows to the control port 42 of the shutoff valve 44 to open this for normal brake operation as previously explained. At the same time fluid flows by way of conduit 84 to the lock port 72 to urge the locking mechanism to its unlocking position and fluid pressure is also admitted by way of conduit 108 to the control port 106 of the control valve 100 where it operates on the piston member 120 to move the plunger 114 of the valve upwardly clear of the check valve 110 so that this is moved to its closed position to interrupt communication between the normally pressurized inlet port 102 and the outlet port 98. At the same time the outlet port 98 and hence the inlet port 94 of the valve 92 are vented to atmosphere through the exhaust passage 116 in the plunger 114 of the valve 100. Under these conditions, repeated uninterrupted service brake applications are possible and the system operates as if the valves 44, 100 and 92 were not parts thereof.

When the vehicle is to be parked or in the event of an emergency, the handle 34 of the control valve 32 is either pulled out manually or snaps out automatically at a predetermined pressure to connect the outlet port 36 with the exhaust port 38 whereupon the valve 44 operates to positively disconnect the brake valve 60 from the service port 66 of the actuator as previously explained. At the same time any pressure trapped in the service cavity 73 escapes around the lip of the cup washer 50 (see FIG. 4) to the control port 42 of valve 44 and hence to atmosphere by way of conduit 40 and outlet and exhaust ports 36, 38 of valve 32. At this juncture fluid pressure is relieved from the lock port 72 so that the lock is free to move to locking position and pressure is also relieved from the control port 106 of the valve 100 so that the plunger 114 is automatically moved to the normal open position of FIG. 3 whereby reservoir pressure at the inlet port 102 is communicated with the inlet port 94 of the valve 92. From the inlet port 94 fluid flows to the outlet port 90 and thence by way of conduit 88 to the emergency port 70 where it operates on the emergency diaphragm to set the brakes. Simultaneously, reservoir pressure bleeds through the choke 159 at the lower end of the passage 148 in the plunger 146 to pressurize the cavity 158 beneath the piston 150 and after a time delay period of say a second or so, the pressure in the cavity acting on the lower end of the piston 150 causes the latter to move upwardly to interrupt communication of reservoir pressure to the emergency diaphragm 72 and immediately thereafter the outlet port 90 and hence the emergency cavity 85 in the brake actuator are vented to atmosphere through the exhaust port 93 in the valve 92. Sound of air escaping from the emergency cavity in the brake actuator provides an audible indicator to inform the operator that the brakes are set and locked in applied position.

To release a parking or emergency brake application, when reservoir pressure is at its normal predetermined level, the handle 34 of the control valve 32 is pushed downwardly thereby restoring fluid pressure to the whole system for normal operation. A service brake application at this juncture will cause the service diaphragm 74 to move sufficiently in a brake applying direction to effect breaking free of the brake locking means whereupon they are moved fully to their unlocking position by the fluid pressure already at the lock port 72. When the operator's foot is removed from the pedal of the brake valve 60 the parts of the actuator return to the position of FIG. 1 for normal operation.

It should be apparent from the foregoing that the limiting valve 92 of the invention permits sufficient pressure to be delivered to the emergency cavity of the actuator 68 to effect an emergency or parking application of the brakes with fluid flow being automatically cut off at a sufficiently low level to prevent the brakes being applied with such force that it might be difficult to break the locks free upon a subsequent service application. It will also be apparent that the system of the invention positively prevents the simultaneous admission of fluid pressure to both the service and the emergency diaphragms. This is accomplished by the provision of a service control or cutoff valve 44 which is moved to open position to permit service braking while simultaneously the emergency or parking valve 100 is moved in response to the same control pressure to a position positively preventing the flow of fluid to the emergency diaphragm. Conversely, when the valve 44 is operated to positively prevent service braking, the valve 100 is simultaneously operated to permit emergency or parking braking.

Those skilled in the art will understand that upon loss of main reservoir pressure, there would then be no pressure available to the brake valve 60 but the vehicle could still be brought to a stop by depressing the handle 27 of the two-way valve 24 (presumably the handle 34 of valve 32 would already have snapped to its up position) whereupon pressure in the reserve reservoir 12 would flow to the emergency diaphragm as explained above to set the brakes.

It should be understood that the system and valve of the invention are susceptible of a variety of changes and modifications without however departing from the scope and spirit of the appended claims.

What is claimed is:

1. In a fluid pressure braking system including a source of fluid pressure, a brake actuator, a pair of serially arranged fluid pressure responsive elements operatively connected to said actuator for moving the same in a brake applying direction, a manually operated brake valve having an inlet connected to the source of fluid pressure and an outlet connected to one of said fluid pressure responsive elements, fluid conduit means connecting said source of fluid pressure to the other of said fluid pressure responsive elements, normally closed valve means between the outlet of said brake valve and said one fluid pressure responsive element, normally open valve means in the conduit means between said source and said other fluid pressure responsive element, fluid pressure responsive control means connected to said first named and said second named valve means and responsive to the presence of control pressure to move said first named valve to its open position and said second named valve to its closed position whereby only one of said fluid pressure responsive elements at a time can be communicated with said source of pressure and other valve means movable to connect said other fluid pressure responsive element with atmosphere dependent upon movement of said second named valve to its closed position.

2. In the system of claim 1 including conduit means between said source of fluid pressure and said fluid pressure responsive control means and control valve means in said conduit means having inlet, outlet and exhaust ports and including a part movable from a first position wherein said inlet and outlet ports are connected and the latter is disconnected from said exhaust port to a second position wherein said inlet and outlet ports are disconnected and the latter and hence the fluid pressure responsive control means are connected to said exhaust port.

3. In a fluid pressure braking system including a double diaphragm actuator, a source of fluid pressure and means for limiting delivery of fluid pressure from said source to one diaphragm at a time while positively preventing delivery to the other diaphragm, said means comprising a normally closed valve between said source and one of said diaphragms, a normally open second valve between said source and the other diaphragm, fluid pressure responsive control means operable in response to control pressure to simultaneously move said first valve to open position and said second valve to closed position, a third valve movable to connect said other diaphragm with the atmosphere dependent upon movement of said second valve to closed position, and delivery and exhaust valve means between said source and said control means and operable to connect said control means to said source or to atmosphere to effect movement of said first and second valves between their open and closed positions.

4. The system of claim 3 including a manually operated brake valve between said source and one of said first and second valves.

5. The fluid pressure system of claim 3 wherein said actuator includes fluid pressure released, spring applied brake locking means, fluid conduit means connecting said brake locking means to said delivery and exhaust valve means whereby fluid pressure is delivered to and exhausted from said brake locking means simultaneously with said fluid pressure responsive control means, and a pressure limiting valve between said normally open valve and said other diaphragm for limiting the pressure supplied to the latter.

6. In a fluid pressure responsive braking system including a double diaphragm brake actuator, a source of fluid pressure, fluid pressure released, spring applied brake locking means for locking said actuator in applied position, and a brake valve for controlling the delivery of fluid pressure from said source to one of said diaphragms, a normally closed valve between said brake valve and said one diaphragm, a normally open valve between said source and the other diaphragm, fluid pressure responsive control means operative in response to control pressure to move simultaneously said first named valve to open position and said second named valve to closed position, another valve movable to connect said second diaphragm with the atmosphere dependent upon movement of said second named valve to closed position, a supply and exhaust valve for connecting said fluid pressure responsive control means with said source or with atmosphere, fluid pressure conduit means connecting said brake locking means with said supply and exhaust valve whereby fluid pressure is supplied to or exhausted from said brake locking means simultaneously with said fluid pressure responsive control means, and a pressure limiting valve between said normally open valve and said other diaphragm for limiting the pressure supplied to the latter.

7. In the fluid pressure responsive braking system of claim 6 wherein, said pressure limiting valve comprises a body having an inlet port leading to said normally open valve and an outlet port leading to said second diaphragm, a combined inlet and exhaust valve in said body normally connecting said inlet and outlet ports while disconnecting the latter from atmosphere, a fluid pressure responsive element in said valve body exposed at all times to pressure at said inlet port, flow retarding means interposed between said inlet port and said fluid pressure responsive element, and means operably connected to said fluid pressure responsive element for operating said inlet and exhaust valve means to disconnect said inlet and outlet ports while connecting the latter to atmosphere.

8. In a fluid pressure braking system including a source of fluid pressure, a brake actuator including serially arranged emergency and service diaphragms, a spring applied, fluid pressure released brake locking means for locking the brakes in applied position, a control valve operable to connect said brake locking means with said source of fluid pressure or with atmosphere, a normally open valve controlling communication between said source of pressure and said emergency diaphragm, said valve including a fluid pressure responsive element connected to said control valve and operable to close said normally open valve when brake lock releasing pressure is delivered by said control valve to said brake locking means, a brake valve connected to said source of fluid pressure, a normally closed valve controlling communication between said brake valve and said service diaphragm, said latter valve including a fluid pressure responsive element separate from the first named pressure responsive element and connected to said control valve and operable to open said normally closed valve when brake lock releasing pressure is delivered by said control valve to said brake locking means, said first and second valves being movable to respective open and closed position upon release of pressure from said brake locking means by said control valve whereby pressure is automatically delivered to said emergency diaphragm to apply the brakes while said service diaphragm is positively disconnected from said brake valve and an exhaust valve for connecting said emergency diaphragm to atmosphere dependent upon movement of said normally open valve to closed position.

9. The system of claim 8 including a pressure limiting valve between said normally open valve and said emergency diaphragm, said pressure limiting valve including a normally open valve element and a part responsive to a pre-determined pressure delivered to said emergency diaphragm for moving said valve element to closed position.

10. The system of claim 8 including a pressure limiting valve comprising a body having an inlet port connected to said normally open valve, an outlet port connected to said emergency diaphragm and an exhaust port, a combined inlet and exhaust valve member normally connecting said inlet and outlet ports while disconnecting the latter from said exhaust port, said valve including a fluid pressure responsive element exposed at all times to the pressure at said inlet port and movable in response to a predetermined pressure to operate said combined inlet and exhaust valve member to disconnect said inlet and outlet ports while connecting the latter to said exhaust port.

11. The system of claim 10 including flow retarding means interposed between said inlet port and said fluid pressure responsive means.

12. In the system of claim 6 wherein said pressure limiting valve includes means responsive to a predetermined pressure supplied to said second diaphragm for connecting the latter to atmosphere.

13. The system of claim 8 including a pressure limiting valve between said normally open valve and said emergency diaphragm for limiting the pressure supplied to the latter.

14. The system of claim 13 wherein said pressure limiting valve includes means responsive to a predetermined pressure supplied to said emergency diaphragm for connecting the latter to atmosphere.

15. The system of claim 5 wherein said pressure limiting valve includes means responsive to a predetermined pressure supplied to said other diaphragm for connecting the latter to atmosphere.

16. In a fluid pressure braking system of the type comprising a source of fluid pressure, a brake actuator having serially arranged emergency and service diaphragms, a spring applied fluid pressure released brake locking means for locking the brake in applied position, a first control connection for supplying fluid pressure from said source to said service diaphragm, a second control connection for supplying fluid pressure from said source to said emergency diaphragm, and means for controlling the application of fluid pressure to and from said locking means, the improvement which comprises a pressure limiting valve interposed in one of said connections for limiting the pressure supplied to the diaphragm controlled by the latter connection, said valve including means responsive to a predetermined pressure supplied to the last named diaphragm for connecting the latter to atmosphere.

References Cited by the Examiner
UNITED STATES PATENTS

| | | | |
|---|---|---|---|
| 2,896,666 | 7/1959 | Rockwell | 137—622 |
| 2,912,067 | 11/1959 | Peras | 303—2 |
| 3,087,760 | 4/1963 | Valentine et al. | 303—9 |
| 3,173,726 | 3/1965 | Valentine et al. | 303—9 |

EUGENE G. BOTZ, *Primary Examiner.*